(No Model.)
W. H. SMYTH.
STEAM BEER FOUNTAIN.
No. 566,942. Patented Sept. 1, 1896.
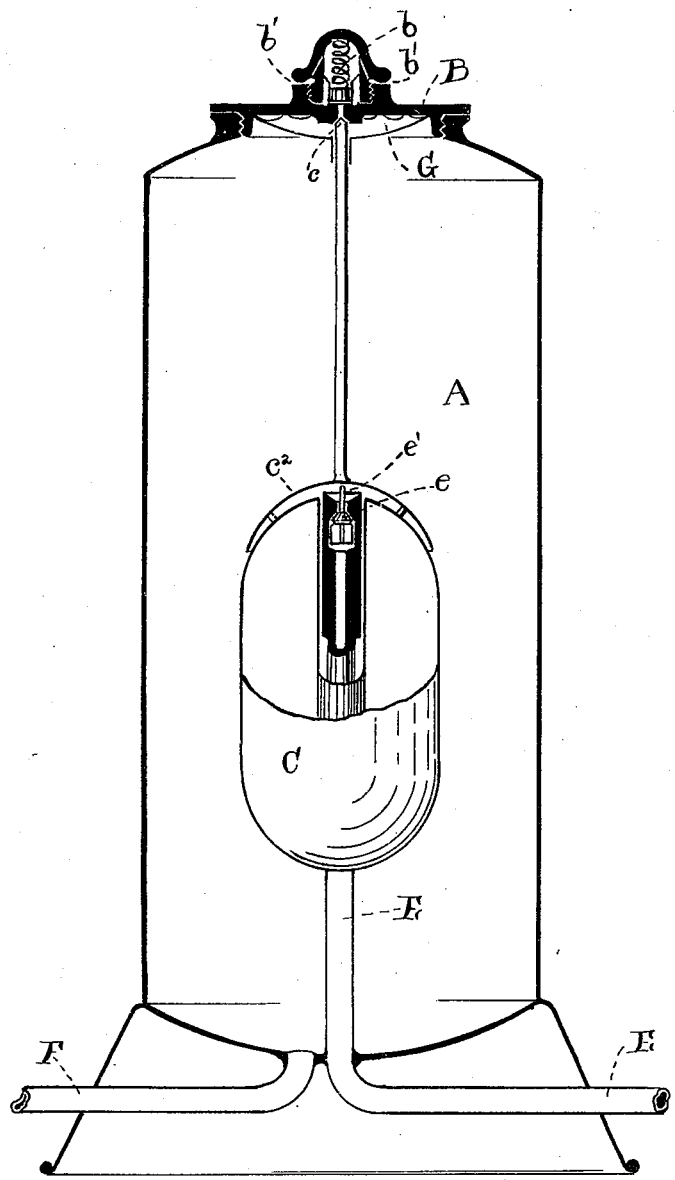
Witnesses
M. S. Norton
J. R. Whalley
Inventor.
William H. Smyth.

UNITED STATES PATENT OFFICE.

WILLIAM HENRY SMYTH, OF BERKELEY, CALIFORNIA.

STEAM-BEER FOUNTAIN.

SPECIFICATION forming part of Letters Patent No. 566,942, dated September 1, 1896.

Application filed January 16, 1896. Serial No. 575,799. (No model.)

*To all whom it may concern:*

Be it known that I, WILLIAM HENRY SMYTH, a citizen of the United States, residing in the town of Berkeley, in the county of Alameda and State of California, have invented a new and useful Steam-Beer Fountain, of which the following is a specification.

My invention relates to the class of devices intended to facilitate the drawing of steam-beer and other similar fluids.

The objects of my invention are to provide a simple, cheap, and efficient device whereby steam-beer may be drawn rapidly with a minimum of foam and maximum of gas, which gives it the desired "sharp" quality. I attain these objects by means of the devices illustrated in the accompanying drawing, which represents a sectional elevation of my invention.

The tank or reservoir A is provided with a cap or cover B. Located in the cover B is a spring-controlled safety-valve $b$, with vent-passages $b'$ $b'$ leading from the topmost part of the valve-chamber. The safety-valve opening is provided with a valve-seat at its lower side for seating of valve $c$, the stem of which extends down to and connects with a float C. This float C slides concentrically upon and is guided by a vertical inlet-pipe E, which extends downwardly to the outside of tank A. The float C is also provided with a deflecting-hood $c^2$, attached to its upper part.

The upper end of inlet-pipe E is provided with an inwardly-opening valve $e$, having a teat or projection $e'$.

In the concavity of the cover B is a cupped plate, notched around its edge and provided with a suitable guide for the stem of valve $c$.

An outlet-pipe P is also provided at the bottom of tank A.

The operation of the device is as follows: Suitable connections having been made, the inlet-pipe E with one or more barrels of beer and the outlet-pipe F with a suitably-located faucet, the device itself being located in an ice-chest, cellar, or other suitable place, the beer is permitted to flow through the inlet-pipe E into the tank A. The valve $e$ offering no obstruction, for the weight of float C rests upon it, depressing it from its seat. The beer in flowing in impinges against the deflecting-plate, which causes it to flow smoothly and evenly without agitation over the float. As soon as the beer has risen in the tank so as to raise the float C and so relieve the teat $e'$ and valve $e$ of its weight, valve $e$ closes by the pressure of the beer beneath it, thereby shutting off the supply of beer. The raising of the float C also forces the valve $c$ onto its seat, closing the gas-outlet. This valve $c$ performs two very important functions. It prevents the escape of gas when the beer is up to the normal level, so that should considerable time elapse between the drawings of beer from the tank A, as, for instance, during the night, no gas at all will escape. Further, in the event of the valve $e$ becoming defective, so as to leak, the valve $c$ forms a check which prevents the escape of beer through the safety-valve. The safety-valve determines the limit of pressure within the tank A. The plate G prevents any foam which may be upon the beer from rising with the gas, and so passing out of the gas-vents $b'$ $b'$ when the safety-valve rises.

Having now described my invention, what I claim as new, and desire to secure by Letters Patent, is—

1. A device comprising a closed vessel having a valve-controlled inlet for beer and outlet for gas—a float therein provided with suitable connections with said valves whereby the inlet-valve is opened by the weight of the float and the gas-outlet closed by its bouyancy.

2. A device comprising a closed vessel having an inlet and an outlet for liquid and an outlet for gas the inlet consisting of a vertical pipe provided with an inwardly-opening valve controlled by a float which is concentrically guided upon the vertical pipe and a gas-outlet which is controlled by a suitable safety-valve on one side and by a valve operated by a float upon the other end of the outlet.

3. A device comprising a closed vessel provided with a float-controlled inlet-valve adapted to be opened by the weight of the float and an outlet for liquid, and a gas outlet one end of which is controlled by a safety-valve and the other end by a valve operated by a float.

WILLIAM HENRY SMYTH.

Witnesses:
M. S. NORTON,
J. R. WHALLEY.